F. B. GIESLER.
WIND MOTOR.
APPLICATION FILED MAY 26, 1919.
1,383,461.
Patented July 5, 1921.
4 SHEETS—SHEET 4.
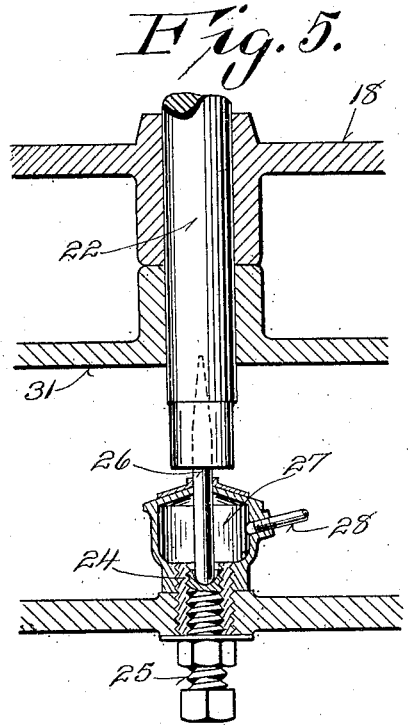
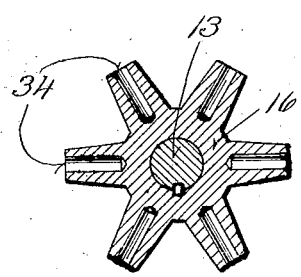
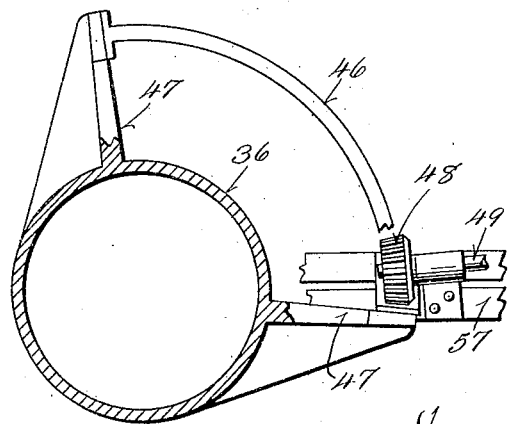
Witness
J. F. Britt
Inventor
F. B. Giesler
By Young & Young
Attorneys

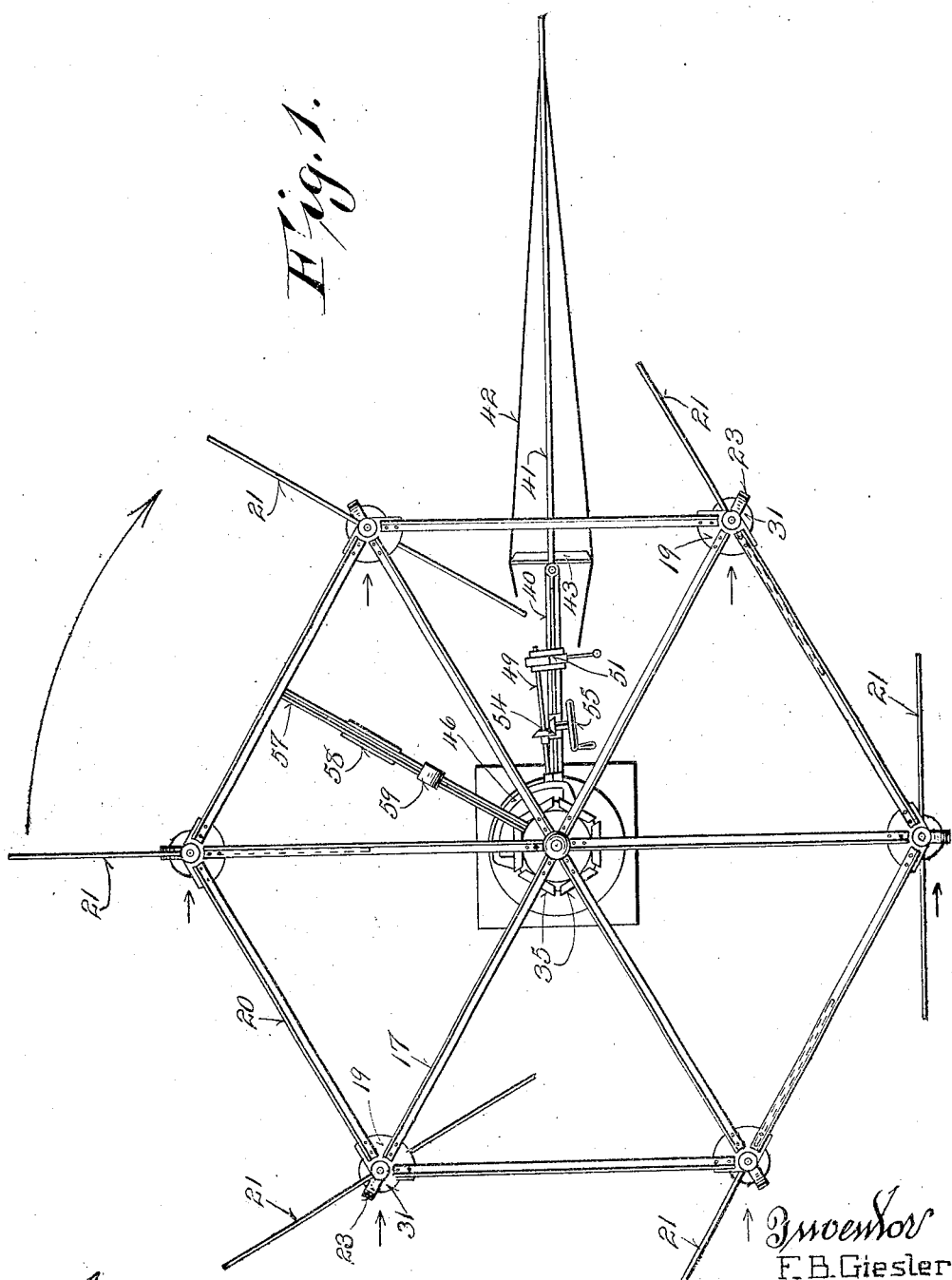

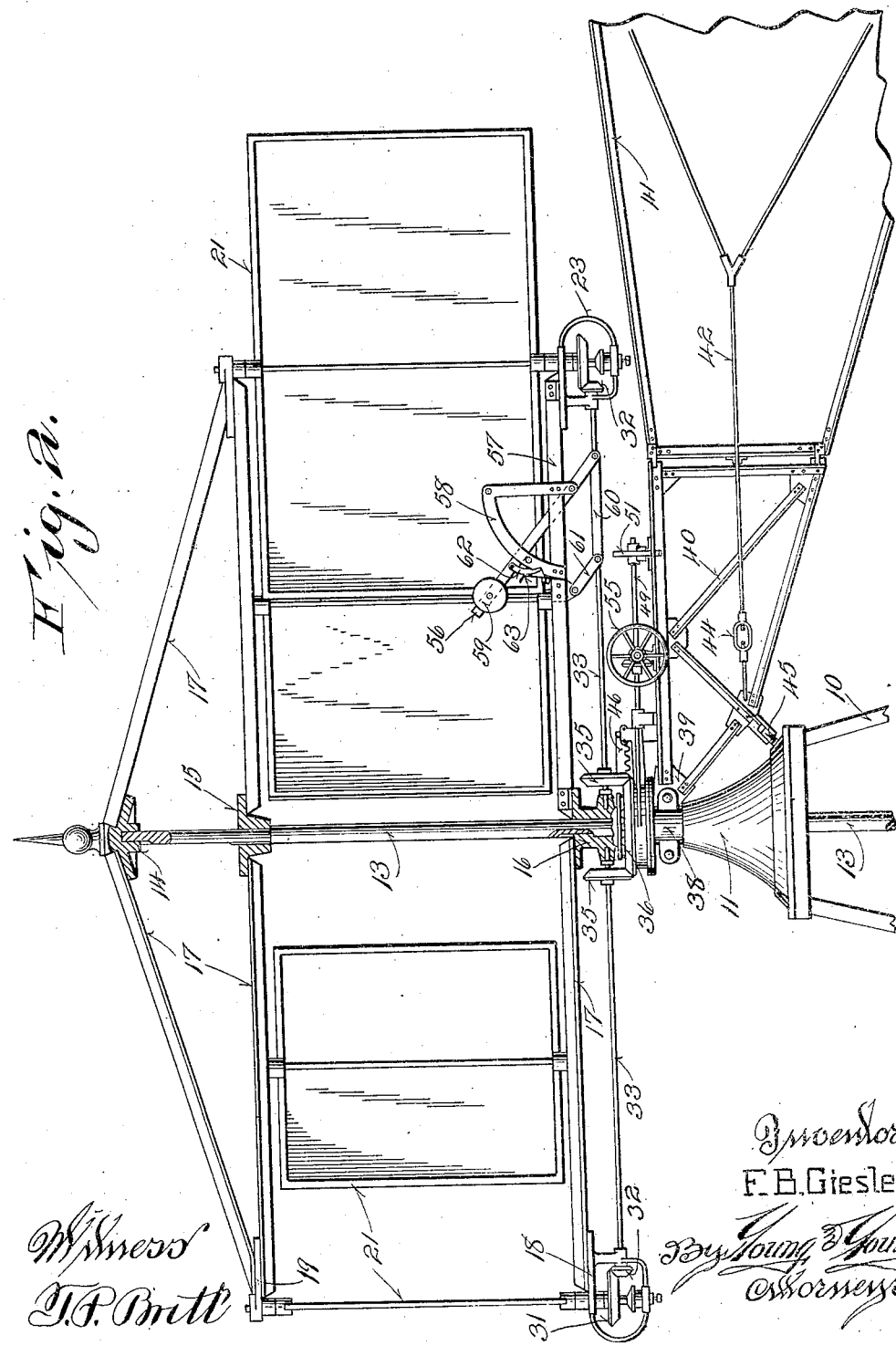

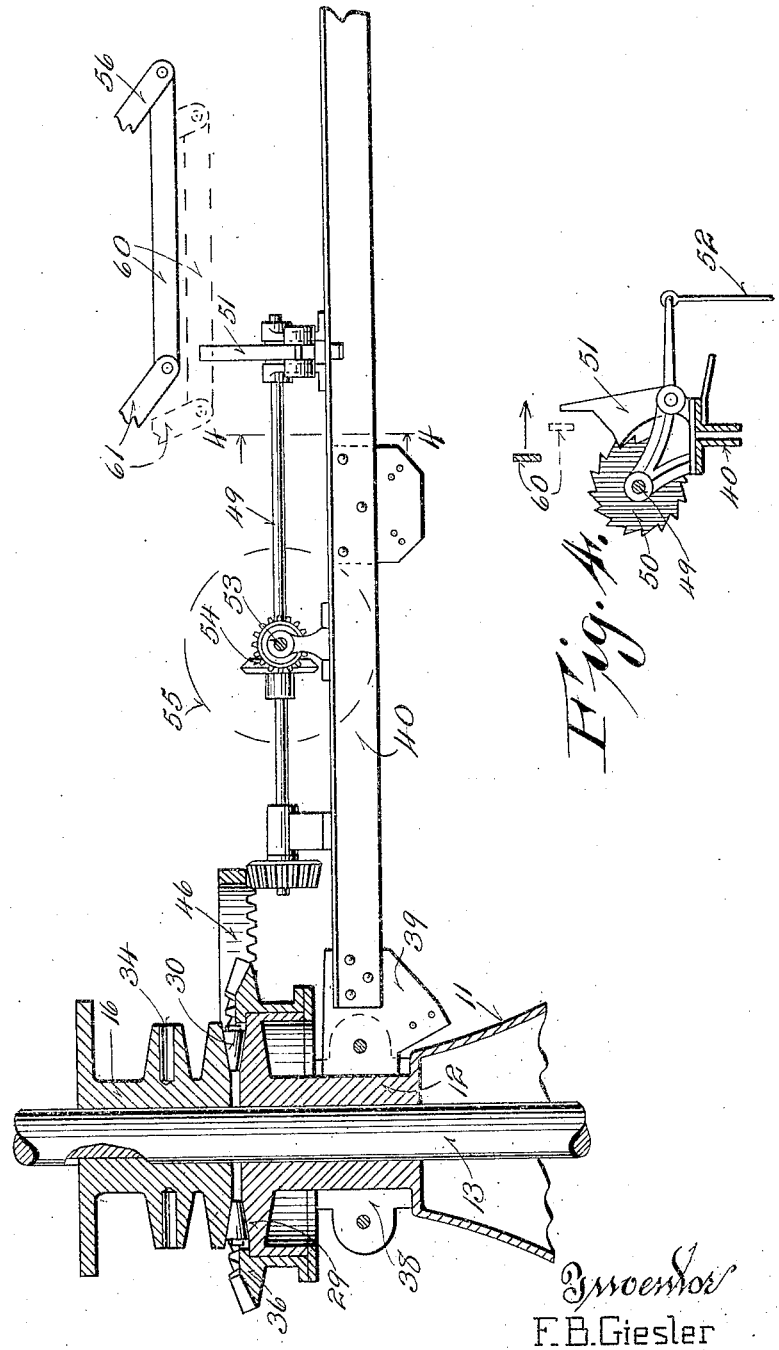

UNITED STATES PATENT OFFICE.

FRANKLIN B. GIESLER, OF MILWAUKEE, WISCONSIN.

WIND-MOTOR.

1,383,461.  Specification of Letters Patent.  Patented July 5, 1921.

Application filed May 26, 1919. Serial No. 299,866.

*To all whom it may concern:*

Be it known that I, FRANKLIN B. GIESLER, a citizen of the United States, and resident of Milwaukee, in the county of Milwaukee and State of Wisconsin, have invented certain new and useful Improvements in Wind-Motors; and I do hereby declare that the following is a full, clear, and exact description thereof.

My invention relates to new and useful improvements in wind motors, more particularly of that type including a head frame rotatable on a vertical axis and carrying sails or vanes having independent movement to procure the proper action of the wind thereon for effecting continuous power transmitting rotation of the head frame.

It is primarily the object of my invention to increase the efficiency of wind motors of this character and to simplify and otherwise improve the structure of such devices as to render them durable in continued operation and susceptible of ready manipulation and adjustment to meet the various conditions of use.

More particularly, it is an important object of my invention to provide a wind motor of this character wherein the sails are effective at practically all times under influence of the wind to impart a continuous rotative force to the head frame, the sails being thus effective at both sides of the axis of the head frame.

A further object resides in the provision of a simple arrangement for procuring planetary movement of the sails upon rotation of the head frame to procure said continuously effective action.

A further important object resides in the provision of a rudder for holding the sails in proper relation to the direction of wind, which is connected with the sails in such manner as to readily permit the sails to assume a neutral or balanced relation with respect to the direction of the wind so as to stop operation of the motor.

A still further object resides in the provision of a governor arrangement for procuring this neutral or balanced position of the sails whereby to stop the operation of the motor at excessive wind velocities, and thus prevent possible damage to the motor by its operation at a dangerously high speed.

I propose to procure planetary movement of the sails by connection thereof with planetary gears in mesh with a gear which is normally rigidly connected with the rudder, and inasmuch as travel of the planetary gears incidental to rotation of the head frame would tend to exert a rotative impulse to the rudder gear and rudder, it is a still further object of my invention to provide an arrangement for adjusting the rudder angularly with respect to the rudder gear so as to maintain the sails in proper relation to the direction of the wind at certain general wind velocities.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a plan view of a wind motor constituting one embodiment of my invention, the sails of the motor being in position to procure operating impulses by impact of the wind.

Fig. 2 is a view partly in section and partly in side elevation of the wind motor shown in Fig. 1, the sails in this instance being disposed in neutral or balanced position whereby to prevent operation of the motor.

Fig. 3 is a detail sectional view through the journal member which carries the rudder gear and associated parts.

Fig. 4 is a detail sectional view through a portion of the rudder frame on a plane indicated by the line 4—4 of Fig. 3 and showing the ratchet for holding the rudder gear in operative position.

Fig. 5 is a detail sectional view through one of the lower sail journals.

Fig. 6 is a detail sectional view through the lower hub of the head frame.

Fig. 7 is a detail view partly in plan, and partly in section of the rudder ring and the shifting rack segment thereof.

Referring now more particularly to the drawings, I preferably mount my improved wind motor on suitable supporting framework 10 which carries a conical member 11 terminating at its upper end in a journal sleeve 12 in which is journaled the vertical power shaft 13 of the motor, which extends downwardly through the frame 10 and from which power may be taken in any suitable manner for driving desired apparatus. The sails of the motor are carried by a skeleton head frame carried by the upper end portion of the shaft 13 above the journal sleeve 12. This head frame comprises upper, intermediate and lower hubs 14, 15 and 16 respectively which are fixed on the shaft and from which extend a radial series of spider arms 17. The spider arms of the lower hub are secured at their outer ends to lower connecting plates 18, while the spider arms of the intermediate hub 15 have their outer ends secured to upper connecting plates 19, each set of connecting plates being connected together by outer bars 20. The spider arms of the upper hub 14 extend obliquely downward and have their outer ends secured to the upper connecting plates 19, thus forming tension bars whereby an exceedingly strong but light head frame structure is procured. Inasmuch as I employ six sails in the present instance, each frame hub is provided with six spider arms 17 for connection with a corresponding number of outer connecting plates, although it will be appreciated that the number of sails may be varied and other head frame structure may be employed which meets the essential requirements of permitting free passage of the wind therethrough and permitting free rotation of the sails. The sails 21 may be of any desired nature and are preferably rectangular in shape and horizontally elongated, and each sail carries a central, vertical shaft 22 which is journaled in a pair of upper and lower outer frame connecting plates 19 and 18 respectively. Each lower connecting plate 18 carries a depending bearing frame 23, the lower stretch of which carries a step bearing for the sail shaft 22 comprising a sleeve 24 threaded in the lower stretch of the frame 23 and having threaded therein a thrust bearing screw 25 engageable by a bearing foot 26 of hard metal depending from the lower end of the sail shaft 22. An oil cup 27 surrounds this bearing foot and is threaded on the upper end of the sleeve 24 to insure an adequate oil supply for the bearing even under the centrifugal conditions set up in rotation of the head frame, this bearing cup being supplied with oil by a pipe 28 extending from any suitable source of supply. The bearing sleeve 12 is provided at its upper end with an outstanding flange 29 and bearing rollers 30 are interposed between this flange and the bottom of the lower hub section of the head frame whereby to provide an anti-friction journal for said head frame. Thus, the head frame may freely rotate and a planetary rotation of the sails may be at the same time procured to effect their proper relations to the direction of wind.

For procuring this planetary rotation of the sails, gears 31 are fixed on the lower ends of the sail shafts 22 and mesh with pinions 32 which are carried on the outer ends of radial shafts 33 which are journaled in the bearing frames 23 and in radial sockets 34 of the lower hub 16 of the head frame. Gears 35 are fixed on the inner end portions of these shafts 33 and mesh with a rudder controlled gear annulus 36 rotatably mounted on the flange 29 of the stationary mean bearing sleeve 12. The relation and relative proportions of these gears is such that upon each rotation of the head frame, the sails will be each imparted a planetary half revolution in a direction opposite to the direction of rotation of the head frame. A split collar 38 is rotatably mounted on the bearing sleeve 12 below the gear annulus 36 and this collar carries a connecting plate 39 for the bars of a frame 40 extending radially from the axis of rotation of the motor. An elongated vertical rudder 41 is hinged at its inner corners to the outer corners of the frame 40 and this rudder is normally held against rotation by tension cables or rods 42 secured to the outer end portion of the rudder and the inner end portion of the frame 40, and having their intermediate portions secured to struts 43 projecting from the pivoted end of the rudder. Turn buckles 44 are disposed in the inner portions of these cables or rods 42 whereby the angularity of the rudder with respect to its carrying frame 40 may be adjusted for a purpose later to be described. While I have described the rudder proper as being connected with a carrying frame 40, it is noted that the frame 40 comprises essentially a part of the general rudder structure and may be hence included in the general term rudder as hereinafter employed. The rudder structure is supported in addition to the split sleeve 38 by one or more rollers 45 carried by the inner lower portion of the frame 13 and riding on a track formed by the lower portion of the conical member 11.

The rudder and gear annulus 36 are normally held in rigid relation by a gear rack quadrant 46 carried by radially outstanding arms 47 on the gear annulus, said rack meshing with a pinion 48 carried by a shaft 49 journaled longitudinally on the top rails of the rudder carrying frame 40, a ratchet wheel 50 being fixed on one end of this shaft and being engageable by a pawl 51 pivoted on the frame to prevent relative rotation of the rudder and gear annulus 36 in wind impelled direction.

Taking up now the operation of the motor, the rudder is normally held in such relation to the sails by reason of its gear connections therewith that the two sails most remote from the plane of the rudder are disposed respectively parallel and at right angles to the plane of the rudder, this relation being shown in Fig. 1 and being maintained in whichever direction the wind may blow by reason of the fact that the rudder and gear structure is freely rotatable. The two sails most remote from the plane of the rudder, which is of course substantially parallel to the direction of the wind, are thus always disposed either at parallel and right-angular relation respectively to the direction of wind, or approximately in such relation in accordance with their movement past the points of farthest distance from the plane of the rudder.

With this relation of the sails and their aforedescribed connections, all of the sails are at all times effective to impart continuous rotative tendency to the head frame, except at the momentary intervals when one of the sails is parallel to the direction of the wind. The sails at one side of the plane of the rudder obviously exert direct rotative impulse to and from their movement to right-angular position to the direction of the wind, their greater force being of course exerted at such right-angular position, while the sails at the other side of the plane of the rudder exert a lesser oblique impulse in their movement to and from parallel position with respect to the wind.

When it is desired to stop the operation of the motor, the pawl 51 is retracted from the ratchet wheel, preferably by means of a depending cable 52 connected with said pawl, and the gear 36 is thus permitted to rotate with respect to the rudder whereby to shift the positions of the sails so that the sails which are disposed most adjacent the plane of the rudder lie respectively at right angles to and coincident with said plane, angularity of the remaining sails being balanced whereby they merely shed the wind and thus no rotative tendency is imparted to the head frame. For resetting the sails to procure operation of the motor, a shaft 53 is journaled transversely on the rudder carrying frame 40 and has bevel gear connection 54 with the shaft 49, the shaft 53 carrying a hand wheel 55 whereby said shaft may be rotated to procure rotation of the sails into operative position.

A centrifugal governor mechanism is provided for automatically stopping operation of the motor at excessive wind velocities, which comprises a lever 56 inclined obliquely upwardly and inwardly from its pivotal connection with a pair of bars 57 extending radially from the lower hub 16 of the head frame, said lever being movable between said bars 57 and between segmental guide bars 58 upstanding from the bars 57. The upper end of the lever carries an adjustable weight 59 and its lower end is extended beyond its pivot and connected with one end of a link 60 which has its other end connected by a link 61 with the bars 57 whereby pivotal movement of the weighted lever will procure vertical movement of the bar 60. A pawl 62 is pivoted to the lever 56 and is normally held in a notch of one of the segment bars 58 by a leaf spring 63 secured to said bar. When the head frame is rotating at or below the maximum desired speed, the force of the spring is sufficient to hold the pawl 62 in the notch of the bar 58 against the outward centrifugal force of the weight 59 of the lever 56. Upon exceeding said speed, the lever will swing upwardly and outwardly and thus lower the links 60 which, as shown more particularly in Fig. 4, will engage the upper end of the pawl 51 in its said lowered position, thus releasing the ratchet wheel and permitting the sails to move to neutral or inoperative position under influence of the wind, thus stopping rotation of the motor.

It is noted that travel of the planetary gears 35 on the gear 36 exerts a rotative drag on said gear in the direction of rotation of the head frame, and this action would tend to swing the rudder and permit a distortion of the desired relative position of the sails and rudder. This action is neutralized by adjusting the angularity of the rudder with respect to its gear 36 preferably through the pivotal connection of the rudder proper and frame 40, as heretofore explained in connection with the turn buckles 44.

I have thus shown and described a simple, efficient and readily manipulated device for procuring a maximum amount of power from the wind in proportion to the size of apparatus employed, and while the structure shown comprises a preferred embodiment of my invention, it will be appreciated that various changes and modifications of structure may be employed without departing in any manner from the spirit of my invention. Also, while I have shown and described my invention as embodied in a wind motor, it will be appreciated that the features of the invention may be incorporated in a motor for operation by any free moving body of fluid.

What is claimed is:

1. A fluid motor of the class described comprising a rotatable head frame, sails carried by said frame and rotatable with respect thereto, a pivoted rudder, a gear connected with the rudder for rotation upon pivotal movement of the rudder, planetary gears carried by the head frame and meshing with said first gear, connections between said planetary gears and the sails for procuring planetary rotation of the sails upon rotation of the head frame, and means for interrupting the connection between the first named gear and the rudder to permit said gear to rotate independently of pivotal movement of the rudder.

2. A fluid motor of the class described comprising a rotatable head frame, sails carried by said head frame and rotatable with respect thereto, a gear rotatably mounted concentric with the axis of rotation of the head frame, planetary gears carried by the head frame and meshing with the first gear, connections between said planetary gears and the sails for procuring planetary rotation of the sails upon rotation of the head frame, a rudder pivoted concentric to the axis of the first gear, a toothed rack segment carried by the gear, a shaft on the rudder, a gear on the shaft meshing with said rack, means for releasably holding the shaft against rotation, and means for rotating the shaft.

3. A fluid motor of the class described comprising a rotatable head frame, sails carried by said head frame and rotatable with respect thereto, a gear rotatably mounted concentric with the axis of rotation of the head frame, planetary gears carried by the head frame and meshing with the first gear, connections between said planetary gears and the sails for procuring planetary rotation of the sails upon rotation of the head frame, a rudder pivoted concentric to the axis of the first gear, a toothed rack segment carried by the gear, a shaft on the rudder, a gear on the shaft meshing with said rack, means for releasably holding the shaft against rotation, means for rotating the shaft, and means operable automatically upon excessive speed of rotation of the head frame for releasing said shaft holding means.

4. A fluid motor of the class described comprising a rotatable head frame, sails carried by said head frame and rotatable with respect thereto, a gear rotatably mounted concentric with the axis of rotation of the head frame, planetary gears carried by the head frame and meshing with the first gear, connections between said planetary gears and the sails for procuring planetary rotation of the sails upon rotation of the head frame, a rudder pivoted concentric to the axis of the first gear, a toothed rack segment carried by the gear, a shaft on the rudder, a gear on the shaft meshing with said rack, means for releasably holding the shaft against rotation, means for rotating the shaft, and a centrifugally controlled abutment member carried by the head frame and engageable with the shaft holding means to release said means.

5. A fluid motor of the class described including a main bearing member, a shaft extending through said bearing member, a head frame fixed on the shaft, sails carried by the head frame and rotatable with respect thereto, a gear rotatable on the journal member, connections between said gear and the sails for procuring planetary rotation of the sails upon rotation of the shaft and head frame, a rudder rotatably mounted on the bearing member, and a connection between said rudder and the gear for preventing relative movement of the rudder and gear.

6. A fluid motor of the class described including a main support, a bearing member carried by the main support, a shaft extending through the bearing member, a head frame carried by said shaft above the bearing member, sails carried by the head frame and movable with respect thereto, a collar rotatable on the bearing member, a rudder secured to said collar, means controlled by said rudder for progressively changing the position of the sails with respect to the head frame upon rotation of the head frame, an annular track on the main support below the bearing member, and a roller on the rudder engaging said annular track.

7. A fluid motor of the class described comprising a rotatable head frame, sails carried by said head frame and rotatable with respect thereto, a gear rotatably mounted concentric with the axis of rotation of the head frame, planetary gears carried by the head frame and meshing with the first gear, connections between said planetary gears and the sails for procuring planetary rotation of the sails upon rotation of the head frame, a rudder pivoted concentric to the axis of the first gear, a toothed rack segment carried by the gear, a shaft on the rudder, a gear on the shaft meshing with said rack, means for rotating the shaft, a ratchet wheel on the shaft, and a pawl on the rudder engageable with said ratchet wheel to hold the shaft against rotation.

8. A fluid motor of the class described comprising a rotatable head frame, sails carried by said head frame and rotatable with respect thereto, a gear rotatably mounted concentric with the axis of rotation of the head frame, planetary gears carried by the head frame and meshing with the first gear, connections between said planetary gears and the sails for procuring planetary rotation of the sails upon rotation of the head frame, a rudder pivoted concentric to the axis of the first gear, a toothed rack segment carried by the gear, a shaft on the rudder, a gear on the shaft meshing with rudder, a gear on the shaft meshing with said rack, means for rotating the shaft, a ratchet wheel on the shaft, a pawl on the rudder engageable with said ratchet wheel to hold the shaft against rotation, a lever pivoted to the head frame and movable radially thereof, a governor weight on the lever, and a member carried by the lever and movable into the path of the lever upon centrifugal outward movement of the lever.

9. A fluid motor of the class described including a rotatable head frame, sails carried by said head frame and rotatable with respect thereto, a rotatable gear concentric with the axis of rotation of the head frame, planetary gears carried by the head frame and meshing with said first gear, connections between said planetary gears and the sails for procuring planetary rotation of the sails upon rotation of the head frame, means for normally holding the first named gear against rotation, a pair of parallel guide bars carried by and extending radially with respect to the head frame, a weighted lever pivoted to the head frame and extending between said bars, and a member connected with said lever and engageable with the gear holding means for releasing said gear holding means.

10. A fluid motor of the class described including a rotatable head frame, sails carried by said head-frame and rotatable with respect thereto, a rotatable gear concentric with the axis of rotation of the head frame, planetary gears carried by the head frame and meshing with said first gear, connections between said planetary gears and the sails for procuring planetary rotation of the sails upon rotation of the head frame, means for normally holding the first named gear against rotation, a pair of parallel guide bars carried by and extending radially with respect to the head frame, a weighted lever pivoted to the head frame and extending between said bars, a pawl pivoted to said lever, one of said bars being notched to receive the pawl, a spring engaging said pawl to hold it in the notch against centrifugal action, and a member connected with said lever and engageable with the gear holding means for releasing said gear holding means.

11. A fluid motor of the class described including a vertical main bearing member, a shaft extending through said bearing member, an outstanding annular flange at the upper end of the bearing member, a head frame fixed on the shaft and including a lower hub having bearing support on said flange, a gear annulus rotatably mounted on the flange, planetary gears carried by the head frame and meshing with said gear annulus, sails carried by the head frame and rotatable with respect thereto, connections between said planetary gears and the sails for procuring planetary rotation of the sails upon rotation of the head frame, a pivoted rudder, a connection between said rudder and the gear annulus, to cause them to rotate in unison, and means for interrupting said connection to permit said gear to rotate independently of pivotal movement of the rudder.

In testimony that I claim the foregoing I have hereunto set my hand at Milwaukee, in the county of Milwaukee and State of Wisconsin.

FRANKLIN B. GIESLER.